(12) United States Patent
Siegler et al.

(10) Patent No.: US 11,414,023 B2
(45) Date of Patent: Aug. 16, 2022

(54) DEVICE FOR MOUNTING AN OBJECT ON AN INTERIOR TRIM OF A VEHICLE, AND VEHICLE

(71) Applicant: Volkswagen Aktiengesellschaft, Wolfsburg (DE)

(72) Inventors: Philipp Siegler, Gifhorn (DE); Thomas Stampe, Lehrte (DE); Roland Klein, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 551 days.

(21) Appl. No.: 16/447,464

(22) Filed: Jun. 20, 2019

(65) Prior Publication Data

US 2019/0308561 A1    Oct. 10, 2019

Related U.S. Application Data

(63) Continuation of application No. PCT/EP2017/079235, filed on Nov. 14, 2017.

(30) Foreign Application Priority Data

Dec. 20, 2016 (DE) .................... 10 2016 225 658.0

(51) Int. Cl.
*B60R 11/00* (2006.01)
*B60R 13/02* (2006.01)
*B60R 13/01* (2006.01)

(52) U.S. Cl.
CPC ............ *B60R 11/00* (2013.01); *B60R 13/011* (2013.01); *B60R 13/0243* (2013.01);
(Continued)

(58) Field of Classification Search
CPC ... B60R 11/00; B60R 13/011; B60R 13/0243; B60R 2011/0021; B60R 2011/0071; B60R 2013/016
(Continued)

(56) References Cited

U.S. PATENT DOCUMENTS 4,630,794 A * 12/1986 Ross .................. A47K 5/08
                                                    206/77.1
4,717,192 A *  1/1988 Iwamura ............. B60J 7/11
                                                    108/133
(Continued)

FOREIGN PATENT DOCUMENTS

DE      8424975         5/1985
DE    10218995 A1     11/2003
(Continued)

OTHER PUBLICATIONS

International Search Report dated Jan. 12, 2018 in corresponding application PCT/EP2017/079235.
(Continued)

*Primary Examiner* — Christopher Garft
*Assistant Examiner* — Michael McDuffie
(74) *Attorney, Agent, or Firm* — Muncy, Geissler, Olds & Lowe, P.C.

(57) ABSTRACT

A device for mounting an object on an interior trim of a vehicle. The interior trim forms a depression for receiving the object and has a holder to fix the object in the depression. Advantageously, at least two oppositely arranged protrusions, which function as a first holder and which narrow a loading opening of the depression, are provided and arranged such that during the loading of the depression with the object to be mounted, the object can be inserted into the depression between the protrusions solely with its narrow side in front and is held or can be held in the depression, in
(Continued)

particular on all sides, via a subsequent rotational movement about a longitudinal axis of the object.

13 Claims, 5 Drawing Sheets

(52) U.S. Cl.
CPC ............ *B60R 2011/0021* (2013.01); *B60R 2011/0071* (2013.01); *B60R 2013/016* (2013.01)

(58) Field of Classification Search
USPC .... 248/634, 686, 27.1, 27.3, 220.21, 221.11, 248/222.11, 222.12, 222.13, 222.51, 248/222.52, 223.31, 223.41, 224.51, 248/224.7
See application file for complete search history.

(56) References Cited

U.S. PATENT DOCUMENTS

| | | | | |
|---|---|---|---|---|
| 5,245,511 | A * | 9/1993 | Watanabe | H04B 1/082 248/27.3 |
| 5,702,144 | A | 12/1997 | Matsuura et al. | |
| 5,823,495 | A * | 10/1998 | Joss | B60R 11/0205 248/309.1 |
| 6,126,221 | A * | 10/2000 | Kern | B60R 7/04 296/37.7 |
| 7,484,702 | B2 * | 2/2009 | Ikunami | B60R 11/0235 248/222.11 |
| 7,708,233 | B2 * | 5/2010 | Tannas, Jr. | B60R 11/0235 248/27.1 |
| 7,942,474 | B2 * | 5/2011 | Jones | B60R 11/0264 296/214 |
| 8,157,314 | B2 * | 4/2012 | Gwon | B60R 1/04 296/37.7 |
| 8,371,539 | B2 * | 2/2013 | Hirota | G08C 17/02 248/27.1 |
| 8,523,117 | B2 * | 9/2013 | Hirota | H05K 7/1405 248/27.1 |
| 8,596,411 | B2 * | 12/2013 | Liang | H04M 1/03 181/199 |
| 8,857,560 | B1 * | 10/2014 | Liao | G10K 11/002 181/199 |
| 2003/0174463 | A1 * | 9/2003 | Chen | B60R 11/0252 361/679.26 |
| 2007/0176452 | A1 | 8/2007 | Schultz et al. | |
| 2007/0222257 | A1 * | 9/2007 | Flendrig | B60J 5/0405 296/146.6 |
| 2015/0048217 | A1 * | 2/2015 | Prin | B60K 37/04 248/27.1 |
| 2016/0200268 | A1 * | 7/2016 | Morris | F16B 11/00 248/27.3 |
| 2016/0375841 | A1 | 12/2016 | Schaefer et al. | |

FOREIGN PATENT DOCUMENTS

| | | |
|---|---|---|
| DE | 102006020953 A1 | 1/2008 |
| DE | 102007034233 A1 | 4/2008 |
| DE | 102012106739 A1 | 5/2014 |
| DE | 102014207362 A1 | 10/2015 |
| DE | 202015001437 U1 | 5/2016 |
| DE | 202016103397 U1 | 8/2016 |
| EP | 0893307 A2 | 1/1999 |
| JP | S61167180 A | 7/1986 |
| JP | S6372138 U | 5/1988 |
| JP | H0999742 A | 4/1997 |
| JP | 2003118492 A | 4/2003 |
| JP | 2004122982 A | 4/2004 |
| JP | 2005247238 A | 9/2005 |
| JP | 2006335307 A | 12/2006 |
| JP | 2009161110 A | 7/2009 |
| JP | 2009292270 A | 12/2009 |
| JP | 2011230541 A | 11/2011 |
| KR | 19990025156 U | 7/1999 |
| KR | 20130058832 A | 6/2013 |

OTHER PUBLICATIONS

Japanese Office Action dated Jun. 5, 2020 in corresponding application 2019-553627.

* cited by examiner

DEVICE FOR MOUNTING AN OBJECT ON AN INTERIOR TRIM OF A VEHICLE, AND VEHICLE

This nonprovisional application is a continuation of International Application No. PCT/EP2017/079235, which was filed on Nov. 14, 2017, and which claims priority to German Patent Application No. 10 2016 225 658.0, which was filed in Germany on Dec. 20, 2016, and which are both herein incorporated by reference.

BACKGROUND OF THE INVENTION

Field of the Invention

The present invention relates to a device for mounting an object on an interior trim of a vehicle, in particular of a motor vehicle, and to a vehicle, in particular a motor vehicle, having such a device.

Description of the Background Art

DE 20 2015 001 437 U1 describes a tailgate trim panel for a motor vehicle with a recess for stowing a warning triangle. The warning triangle is releasably attached in said recess by means of a multipart fastener. This document does not describe how the attachment is effected in detail.

DE 10 2006 020 953 A1 describes a device for receiving an object used in a motor vehicle, such as a warning triangle, a first aid kit, or the like. The device has a recess in a trim part of a trunk lid of the motor vehicle, which recess is provided for accommodating said object. At one edge region of the recess, first holding elements in the form of elastically mounted barbed hooks are arranged opposite one another at one end of the recess in order to lock the object in the recess by engaging with it. In addition, at the other end of the recess second holding elements are provided opposite one another, which protrude over the loading opening of the recess as a projection of the wall of the recess. During the loading of the recess with said object, the same is first pushed with its one end under the two projections. This is followed by a pivoting movement of the other end of the object into the recess, which is accompanied by a locking of the barbed hooks with the object.

DE 10 2014 207 362 A1 describes a device of the generic type, with a depression in a wall portion of an interior trim of a motor vehicle for receiving a storage container, wherein the depression at both ends has a limited interior trim region covering the loading opening. The loading of the depression with the storage container and the removal of the same from the depression are carried out by moving the storage container in the longitudinal direction against the spring force of a spring disposed in the covered end region of the depression or against a shock-absorbing element in the form of a foam cube, for example, combined with a pivoting movement. The depression has spacer ribs in order to keep the storage container in the depression transverse to the movement direction of the same without play.

SUMMARY OF THE INVENTION

It is therefore an object of the present invention to provide a which ensures with simple manipulation and little effort a secure hold for an object to be mounted releasably in the depression of the interior trim. Further, it is an object of the invention to provide a vehicle having such a device.

Based on a device for mounting an object on an interior trim of a vehicle, in particular of a motor vehicle, wherein the interior trim forms a depression for receiving the object, with a bottom, with wall sections, and with a loading opening for said object and has a holder for fixing the object, said object of the invention is achieved in that the object has a length "l," a width "b," and a height "h," wherein the width "b" is selected to be greater than the height "h" and the length "l" and the width "b" define a broad side and the length "l" and the height "h" define a narrow side of the object, and in that at least two oppositely arranged protrusions, which function as a first holder and which narrow the loading opening, are provided and arranged such that during the loading of the depression with the object to be mounted, the object can be inserted into the depression between the protrusions solely with its narrow side in front and is held or can be held in the depression, in particular is held or can be held on all sides, by means of a subsequent rotational movement about a longitudinal axis of the object.

In this way, a particularly simple and cost-effective holding device is provided to hold the object securely in a depression of said interior trim, said depression corresponding to the object, in particular to hold it securely in all directions. Advantageously, separate attachable securing devices are superfluous. Said object can be fixed in the depression solely by a combination of a linear movement and a subsequent rotational movement by about approximately 90° about said longitudinal axis of the object and thus also allows a one-hand operation.

The object can have a rectangular shape, which is predetermined, for example, by the object itself. In contrast, said, preferably rectangular object can also be formed by a housing for receiving a different object, such as a folded warning triangle or the like, which itself need not have a rectangular shape.

In order to hold the object free of play or almost free of play in the depression, it has a rib structure, functioning as a second holder, with a plurality of individual ribs. Here, the individual ribs of the rib structure can be made rigid or flexible. A flexible, in particular resilient design of the individual ribs also makes it possible to mount the object with a specific pretension in the depression. As the invention provides further preferably, at least some of the individual ribs of the rib structure have at least in areas a course which supports the movement of the object to be mounted during the loading of the depression with the same, in that the particular individual ribs extend in the direction of movement of the object. As a result, the manipulation of the object is advantageously facilitated both during said loading process and during the removal of the object from the depression. For this purpose, individual ribs, provided in the region of the bottom of the depression, preferably have a unidirectional, curved, convex course, which in particular supports said rotary movement of the object or guides the object on a predetermined curved path.

In order to improve still further the fixation of the object within the depression or to provide an alternative to the rib structure with the rigid or flexible individual ribs, at least one resiliently pretensioned holding element, functioning as the third holder, is preferably disposed inside the depression and presses the object inserted into the depression resiliently, i.e., with pretension, against the inner contour of the depression. The holding element can be formed, for example, by a resilient and/or spring-loaded pressure element, an elastomeric body, or the like. To improve the manual manipulation of the object to be mounted still further, at least one wall section of the depression advantageously has a formation for a finger grip.

The invention also relates to a vehicle, in particular a motor vehicle, having a device of the type described above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 9a-c show very schematically three sectional views of the interior trim together with the object to be mounted at an even later time "$t_3$" of the loading process, which corresponds to a holding position of the object (section "I-I," "II-II," "III-III" according to FIG. 3)

DETAILED DESCRIPTION

Figure 1:
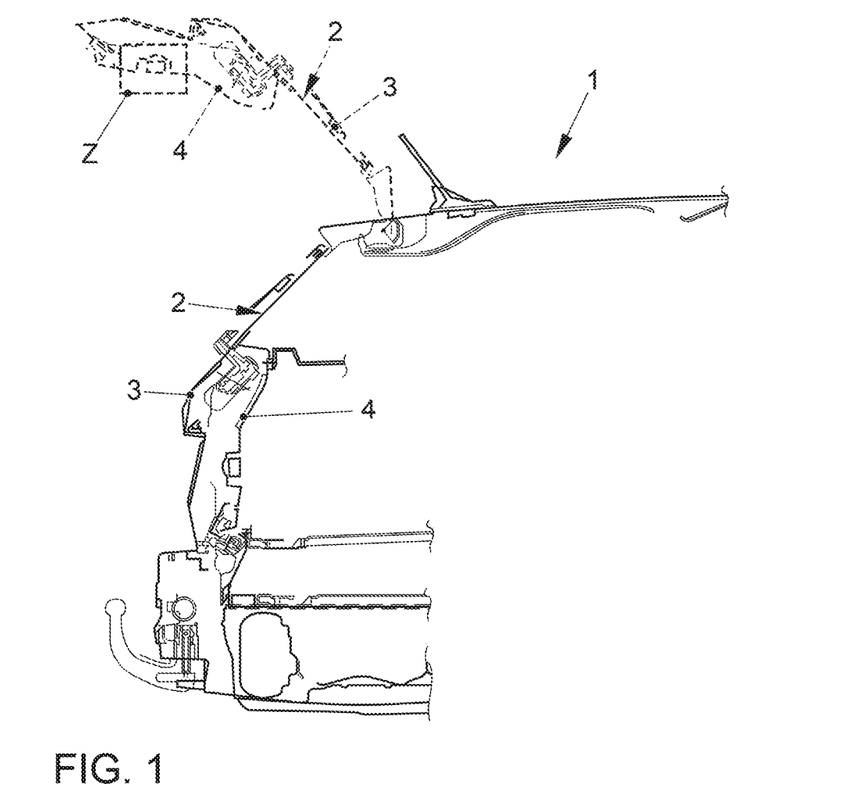
FIG. 1 shows a very schematic sectional view of a vehicle rear (so-called Y0 section) with a tailgate in the closed and open operating state, which tailgate has an interior trim with a device of the invention for mounting an object.
Figure 2:
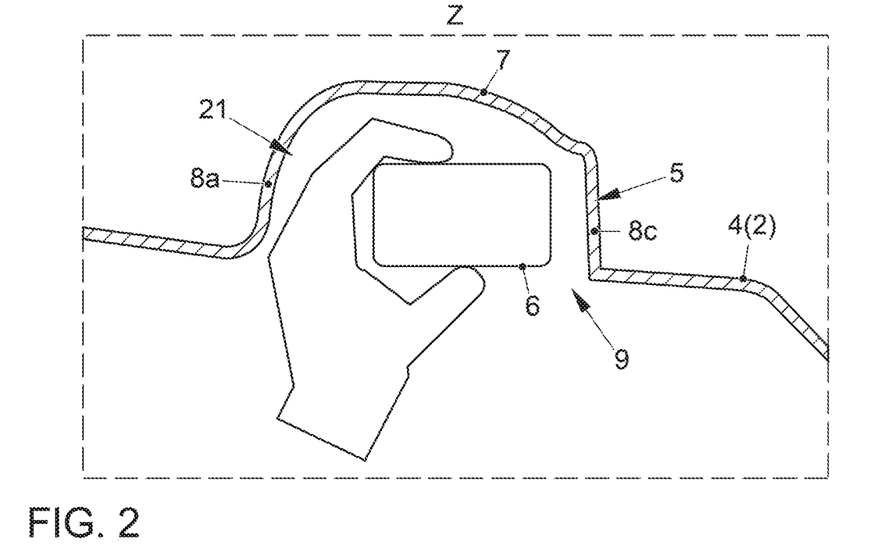
FIG. 2 shows the detail "Z" according to FIG. 1 with a very schematic representation of the manipulation of the object in the open operating state of the tailgate.
Figure 3:
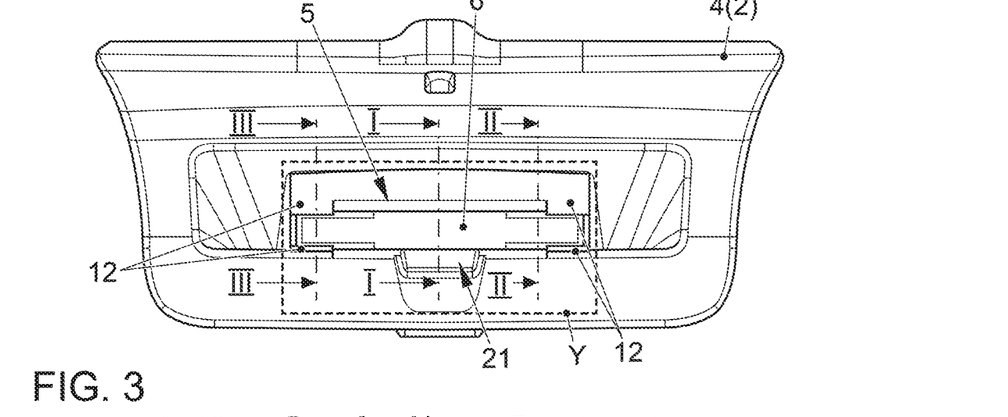
FIG. 3 is a plan view of the interior trim of the tailgate according to FIG. 1 with a mounted object.

FIG. 1 first shows the rear area of a vehicle 1, in the present case a passenger car with a hatchback, which has a tailgate 2, which in the present case is shown both in its closed and in its open operating state (dashed line). Tailgate 2 has an outer panel 3 and an interior trim 4 preferably made of a plastic. Interior trim 4 is preferably produced by a plastic injection molding process known per se.

Interior trim 4 forms a depression 5 for receiving an object 6, with a bottom 7, with wall sections 8a-d, and with a loading opening 9 for said object 6 (cf. FIGS. 2-5). In the open operating state of tailgate 2, said loading opening 9 points at least substantially toward the vehicle bottom (cf. FIG. 2) or in alternative embodiments toward the vehicle rear. Preferably, in this position, depression 5 is loaded with object 6 or object 6 is removed from depression 5.

The object 6 has a rectangular shape and, merely as an example, is a case for a collapsible warning triangle. In general, a warning triangle is to be kept permanently in vehicle 1. However, the invention is not limited to this specifically designated object 6 but covers a variety of objects 6 to be stowed in vehicle 1, such as, for example, a first aid kit as well. In any case, however, it is a prerequisite that object 6 has a length "l," a width "b," and a height "h," wherein the width "b" is selected greater than the height "h" and the length "l" and the width "b" thus define a broad side 10 of object 6 and the length "l" and the height "h" define a narrow side 11 of object 6 (cf. in particular FIG. 5).

Depression 5 has dimensions that allow the most space-saving accommodation possible and manipulation of object 6 in the same. In the present case, depression 5, apart from a convex design of bottom 7 of the same, has a largely rectangular shape. Two oppositely arranged protrusions 12, narrowing loading opening 9, are provided and disposed at both ends of loading opening 9 of depression 5. In this way, a loading opening 9 is provided with dimensions that only allow object 6 to be mounted to be inserted into depression 5 with its narrow side 11 in front and between protrusions 12. In addition, according to the invention, protrusions 12 also function as first holder, which will be discussed in more detail below.

Figure 7A:
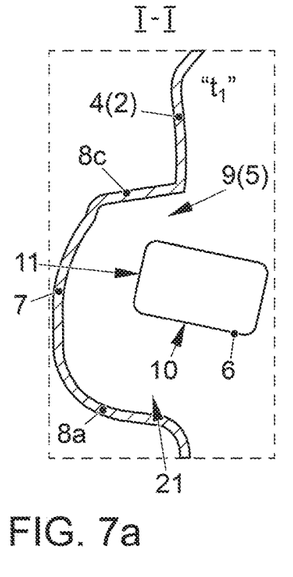
FIGS. 7a-c show very schematically three sectional views of the interior trim together with the object to be mounted at a later time "$t_1$" of the loading process (section "I-I," "II-II," "III-III" according to FIG. 3)
Figure 7B:
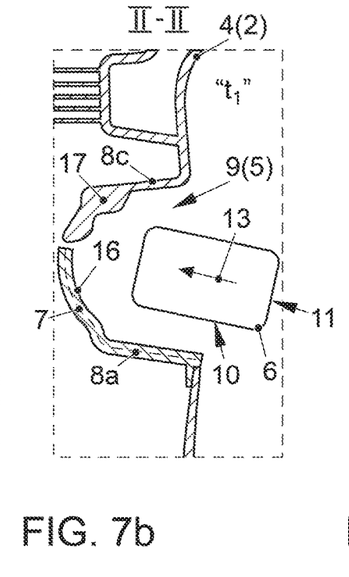
Figure 7C:
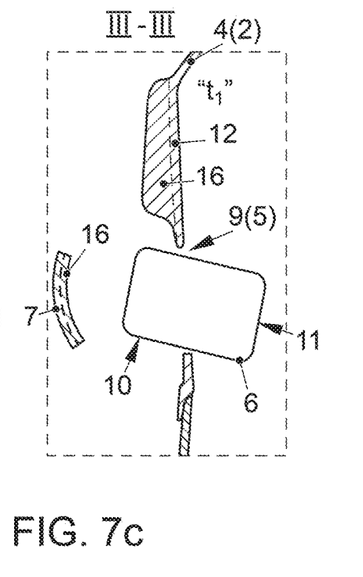
Figure 8A:
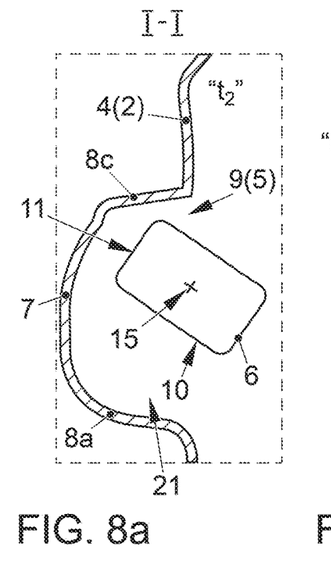
FIGS. 8a-c show very schematically three sectional views of the interior trim together with the object to be mounted at a still later time "$t_2$" of the loading process (section "I-I," "II-II," "III-III" according to FIG. 3)
Figure 8B:
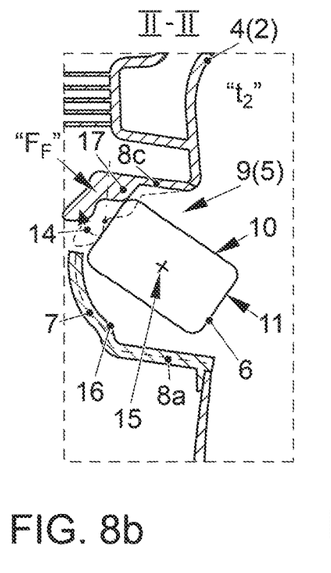
Figure 8C:
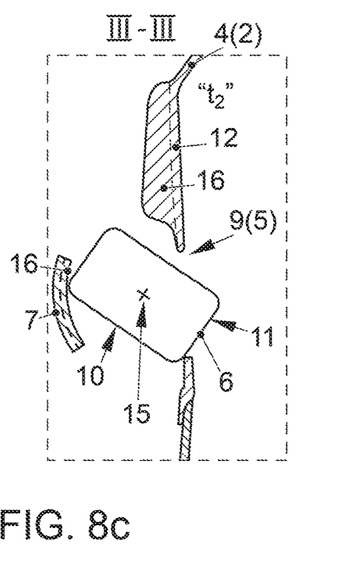
Figure 9A:
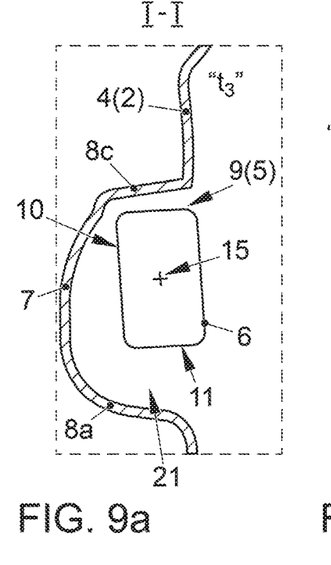
Figure 9C:
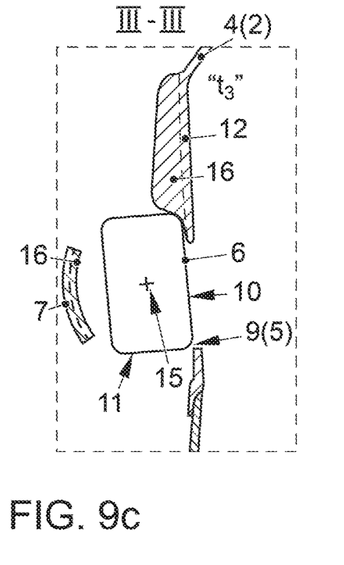

The invention will be described further in its function hereinafter. As already explained above, during the manual loading of depression 5 with an object 6 of the type described, at time "$t_0$" object 6 is positioned first of all with its narrow side 11 in front before the narrowed loading opening 9 (cf. FIG. 5). Following this, at time "$t_1$" (FIG. 7a-c) object 6 is inserted into depression 5 according to direction arrow 13. After this, i.e., at a later time "$t_2$" (FIG. 8a-c), object 6 is rotated according to directional arrow 14 about a longitudinal axis 15 thereof, which extends in the transverse direction, in the present case in the Y direction, of interior trim 4, until at time "$t_3$" a broad side 10 comes to rest or abuts behind protrusions 12 narrowing loading opening 9 (FIG. 9a-c). The rotation angle is about 90°. This position of object 6 corresponds to the mounting position thereof within depression 5. Object 6 is thus held on all sides, namely, on the one hand, by bottom 7 and wall sections 8a-d and, on the other, by protrusions 12, which function as a holder and thus prevent an inadvertent passage of object 6 on its own outward through loading opening 9. The removal of object 6 from depression 5 of the interior trim takes place in the reverse order.

Figure 4:
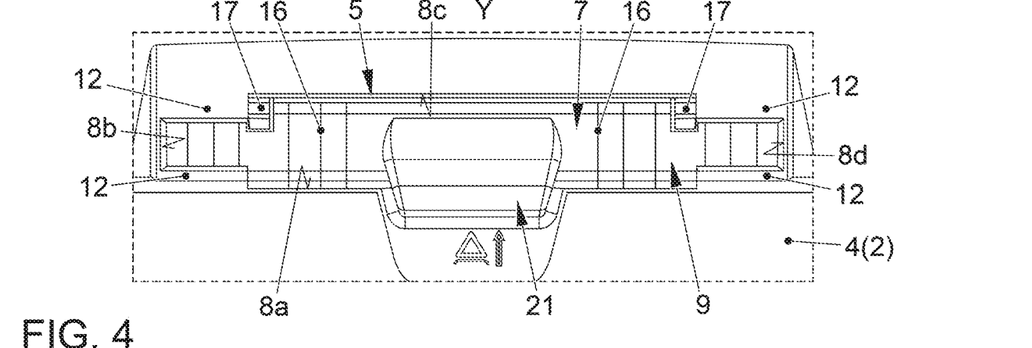
FIG. 4 shows the detail "Y" according to FIG. 3 but without said object.
Figure 5:
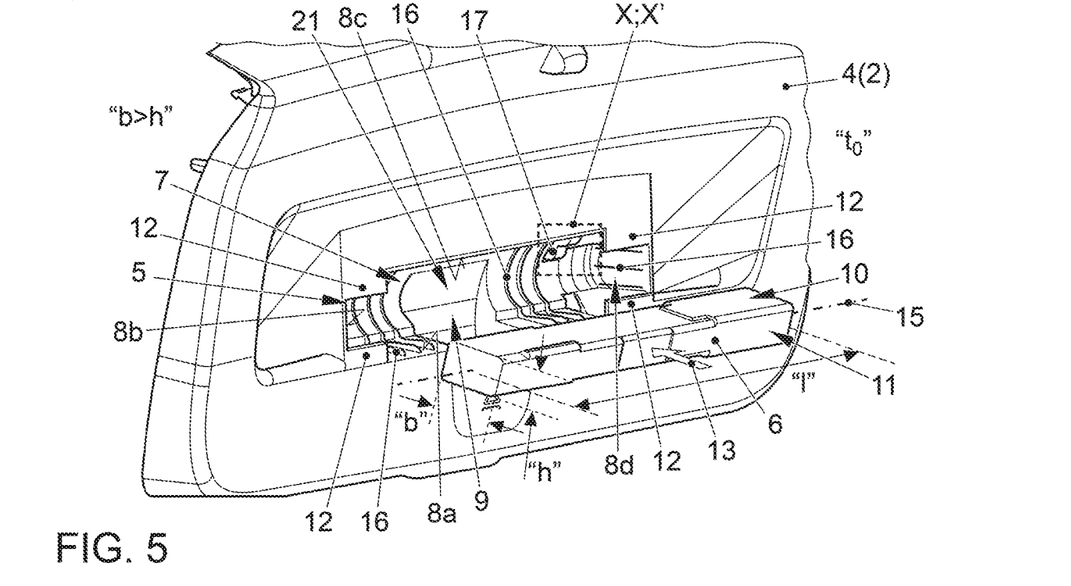
FIG. 5 is a perspective view of the interior trim together with an object to be mounted in a loading position at a time "$t_0$"
Figure 6A:
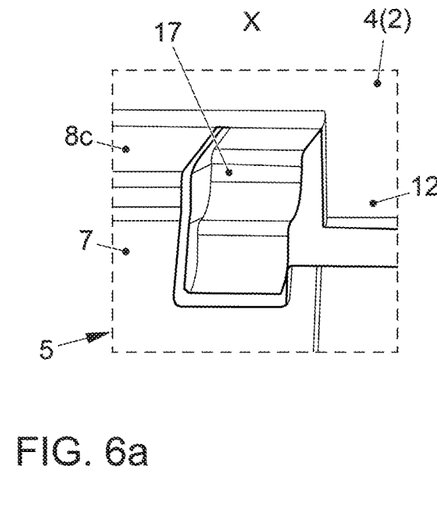
FIG. 6a shows the detail "X" according to FIG. 5 (A side or front side)
Figure 6B:
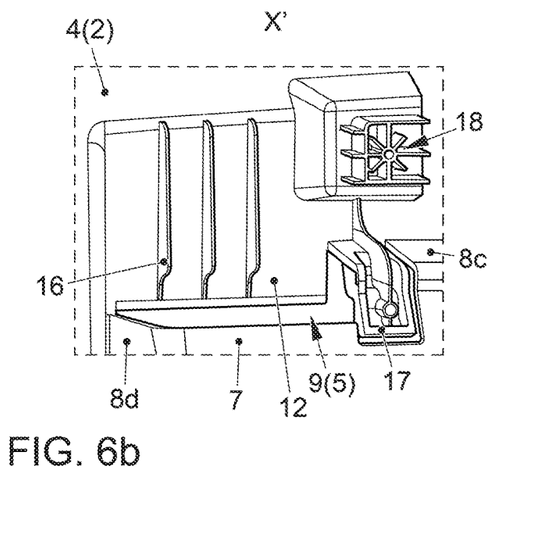
FIG. 6b shows the detail "X'" according to FIG. 5 (B side or rear side)

In order to hold object 6 free of play or virtually free of play in depression 5, depression 5 in the region of bottom 7, wall sections 8a-d, and projections 12 has a rib structure, functioning as a second holder, with a plurality of individual ribs 16 directed into depression 5 (cf. in particular FIGS. 4, 5, and 6b). Individual ribs 16 of the rib structure are preferably rigid or largely rigid and integrally formed with interior trim 4. Alternatively, individual ribs 16 can also be formed flexible, in particular resilient, whereby the possibility is created to mount object 6 with a specific pretension in depression 5. An interior trim 4 with such a rib structure can be produced, for example, by a two-component or multi-component injection molding method. In addition, the above-described rib structure advantageously brings about a stiffening of the region, forming depression 5, of interior trim 4.

As can be gathered further from FIGS. 4, 5, and 6*b*, individual ribs 16 are arranged and formed such that they support the movement of object 6 to be mounted during the loading of depression 5 with the same. It can be seen that individual ribs 16 extend in the direction of movement of object 6 during said loading process. As a result, the manipulation of object 6 is advantageously facilitated both during the loading process and during the removal of object 6 from depression 5.

It can be seen in the detail that individual ribs 16 of wall sections 8*a*-*d* follow unidirectionally, i.e., spaced apart parallel to one another, the initial linear insertion movement, whereas individual ribs 16 of bottom 7, spaced apart parallel to one another, in accordance with the convexity of bottom 7 have a unidirectional, curve-shaped, convex course and thus follow the rotational movement of object 6, said movement following the linear insertion movement (FIGS. 4 and 5). Individual ribs 16 of protrusions 12 are arranged spaced apart and parallel to one another, whereas a curved, convex course is unnecessary because they essentially serve to support object 6 located in its end or mounting position.

In order to improve the fixation of object 6 within depression 5 even further, according to this exemplary embodiment, a resiliently pretensioned holding element 17, functioning as a third holder, is arranged at both ends of depression 5. On the one hand, during the loading process, holding elements 17 permit a resilient yielding of the same (cf. FIGS. 8*b* and 9*b*) and, on the other hand, press object 6, inserted into depression 5 and located in its end or mounting position, with a certain spring force "$F_F$," i.e., with pretension, against inner contour of depression 5.

In the present case, holding elements 17 are formed merely by way of example by resilient and/or spring-loaded, as it were projecting, pressure elements, formed integrally with interior trim part 4. With regard to the last variant, FIG. 6*b* shows a rear view of the relevant region of the interior trim, with a holding element 17, resiliently supported on interior trim 4, together with a rigidly formed spring mount 18 of interior trim 4, a spring mount 18 to which a leaf spring can be screwed, which is then supported at one end on interior trim 4 and at the other end on the free end of holding element 17.

Figure 10:
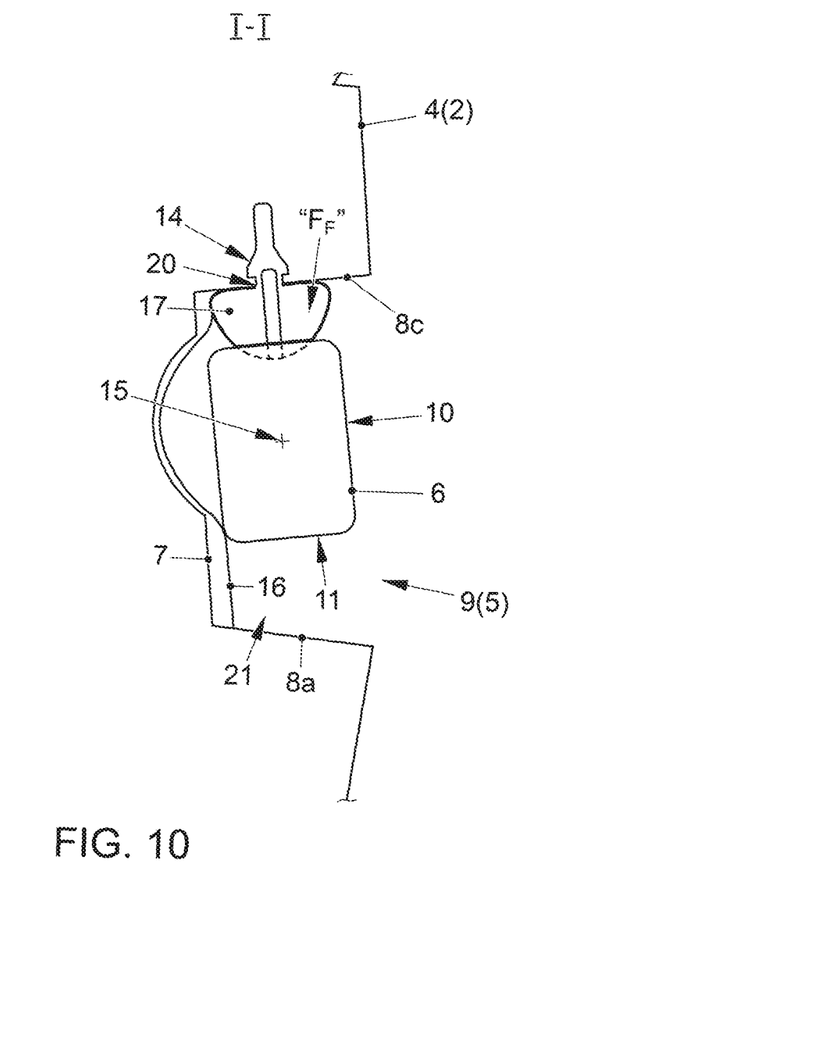
FIG. 10 shows a very schematic sectional view of an alternative device for mounting an object (section "I-I" according to FIG. 3).

However, the invention is not limited to the preferred holding elements 17 described above, but covers, e.g., also one, two, or more holding elements 17 that are formed, for example by an elastomeric body, such as, for example, by a foam body made of elastic plastic foam, and mounted as attachments on interior trim 4. FIG. 10 therefore shows very schematically an arrangement of such a holding element 17 which is attached by engaging a locking element 19, connected to holding element 17, in a bore 20 of wall section 8*c* of depression 5 on the same.

In order to make the manual manipulation of object 6 to be mounted convenient or to provide sufficient space for manipulation, wall section 8*a* of depression 5 has a formation 21 for a finger grip (cf., in particular, FIGS. 2-4, 7*a*, 8*a*, 9*a*, 10). In the present case, the manipulation area is a middle area of wall section 8*a*.

The exemplary embodiments described above focus on a depression 5 which receives object 6 and which is arranged in an interior trim 4 of a tailgate 2 of a motor vehicle. However, the invention is not limited to this specifically described interior trim part, but also covers any other interior trim part of a vehicle 1. Thus, said interior trim 4 can also be formed by an interior door trim, an interior roof liner, or the like.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A device for mounting an object on an interior trim of a vehicle, the device comprising:
   a depression, formed in the interior trim, for receiving the object, the depression having a bottom, wall sections surrounding the bottom, and a loading opening for the object, the loading opening opposing the bottom,
   wherein the object has a length "l," a width "b," and a height "h," wherein the width "b" is selected to be greater than the height "h," and wherein the length "l" and the width "b" define broad sides and the length "l" and the height "h" define narrow sides of the object, and
   wherein at least two oppositely arranged protrusions, which function as a first holder and which narrow the loading opening, are provided and arranged such that during the loading of the depression with the object, the object is insertable into the depression between the protrusions solely with one of the narrow sides in front and via a subsequent rotational movement about a longitudinal axis of the object, the object is held in the depression such that one of the broad sides of the object bears against an inner surface of the protrusions, the inner surface of the protrusions facing the bottom of the depression.

2. The device according to claim 1, wherein the object has a rectangular shape.

3. The device according to claim 1, wherein the depression has a rib structure, functioning as a second holder, with a plurality of individual ribs.

4. The device according to claim 3, wherein the individual ribs of the rib structure are made rigid or flexible.

5. The device according to claim 3, wherein at least some of the individual ribs of the rib structure are shaped, at least in areas, so as to extend in a direction of movement of the object during the loading of the object in the depression to support the movement of the object.

6. The device according to claim 5, wherein the individual ribs, provided in the region of the bottom of the depression, have a unidirectional, curved, convex course.

7. The device according to claim 3, wherein at least one resiliently pretensioned holding element, functioning as a third holder, is disposed within the depression and presses the object inserted into the depression resiliently against an inner contour of the depression.

8. The device according to claim 7, wherein the holding element is formed by a resilient and/or spring-loaded pressure element, or an elastomeric body.

9. The device according to claim 1, wherein at least one wall section of the depression has a formation for a finger grip for the manual manipulation of the object.

10. A vehicle, having a device according to claim 1.

11. The device according to claim 1, wherein the object is held in the depression such that the one of the broad sides of the object bears directly against the inner surface of the protrusions.

12. The device according to claim 1, wherein the protrusions are stationarily fixed with respect to the loading opening, such that during the loading of the object into the depression and unloading of the object out of the depression, the protrusions remain stationary.

13. The device according to claim 1, wherein once the object is loaded into the depression, both of the broad sides of the object are disposed inside the depression.

* * * * *